United States Patent [19]

Slemon

[11] 4,360,249
[45] Nov. 23, 1982

[54] OPTICAL FEEDTHROUGH FOR PRESSURE VESSELS

[75] Inventor: Charles S. Slemon, Encinitas, Calif.

[73] Assignee: Tetra-Tech, Inc., Pasadena, Calif.

[21] Appl. No.: 85,817

[22] Filed: Oct. 17, 1979

[51] Int. Cl.² ................................................ G02B 5/14
[52] U.S. Cl. ............................. 350/96.18; 350/96.20
[58] Field of Search ............... 350/96.18, 96.20, 96.21, 350/96.22, 179

[56] References Cited

U.S. PATENT DOCUMENTS

| | | | |
|---|---|---|---|
| 3,825,320 | 7/1974 | Redfern | 350/96.18 |
| 3,829,195 | 8/1974 | Rawson | 350/96.18 |
| 3,951,515 | 4/1976 | Allard | 350/96.22 |
| 4,119,362 | 10/1978 | Holzman | 350/96.18 |
| 4,183,618 | 1/1980 | Rush et al. | 350/96.18 |

FOREIGN PATENT DOCUMENTS

| | | | |
|---|---|---|---|
| 2745940 | 4/1978 | Fed. Rep. of Germany | 350/96.18 |
| 2828989 | 1/1979 | Fed. Rep. of Germany | 350/96.18 |

OTHER PUBLICATIONS

K. Kobayashi et al. "Micro-Optics Devices for Branching, Coupling, Multiplexing and Demultiplexing" in *Conf. on Integrated Optics and Optical Fiber Communication* paper B11-3, 1977 IOOC.

*Primary Examiner*—Rolf G. Hill
*Attorney, Agent, or Firm*—Peter I. Lippman

[57] ABSTRACT

Each of two optical fibers to be mated is cemented to one end of a respective quarter-pitch segment of graded-index rod, at the axis of the rod. The opposite end of each of the two quarter-pitch segments is polished flat, perpendicular to the axis. The two polished ends are faced toward each other and held in precise parallelism, but not necessarily touching, by a suitable connector housing. An optical signal from one optical fiber is collimated by its attached graded-index rod segment for transmission across the gap to the other rod, which in turn focuses the parallel rays onto the receiving tip of its attached optical fiber.

A planar window, such as a pressure window of a deep-underwater craft, may be interposed between the two sides of the connector without disturbing performance.

1 Claim, 2 Drawing Figures

OPTICAL FEEDTHROUGH FOR PRESSURE VESSELS

BACKGROUND OF THE INVENTION

1. General Field

My invention is in the field of fiber optics, and particularly relates to connectors for fiber-optic circuits. Though my invention has broad general application for such connectors, it has in particular a specialized application in the area of "penetrators" or feed-throughs across high-pressure barriers.

2. Prior Art

Conventional fiber-optic connectors consist of accurately polished tips on the ends of the two fibers to be connected, flat and perpendicular to the axes of the respective fibers, and elaborate hardware for presenting the two flat tips in precise conaxial alignment for mutual abutment. It is a characteristic of such connectors that the two fiber end-faces must seat accurately against each other each time the connector is plugged together.

Ideally the separation of the faces is zero. If they are separated slightly, power transmission between them falls off, following an inverse-square law. On the other hand, if the faces are moved together too forcefully they can grind each other.

Moreover, as will be discussed in greater detail below, accuracy is also essential in aligning the fibers laterally.

Aside from the apparent mechanical design constraints and resulting costs imposed by these accurate-seating requirements, such connection geometries invite malfunction of the optical circuit—and also an aggravated possibility of damage by scratching—if even a very small particle of foreign matter is trapped between the two faces of the connector.

To my knowledge no connector design avoiding this accurate-seating requirement and suitable for practical production-quantity application has been placed in general use or even proposed heretofore.

In recent years there has developed a new kind of optical element, particularly suited for fiber-optic circuits: the "graded-index rod," sometimes abbreviated "GRIN rod." Such rods, which are characteristically many times larger in diameter than typical fibers, have systematically varied index of refraction—generally a maximum value along the central axis of the rod, with refractive index gradually decreasing (usually as a nearly parabolic function) with radial distance from the axis. The pattern of refractive index versus radius is cylindrically symmetrical to a high degree of accuracy. GRIN rods have a remarkable property: within such a rod, optical rays diverging from the axis are progressively deflected (refracted) toward the axis. Those rays which leave the axis within a maximum-apex-angle cone, depending on the precise function followed by the refractive index and also on the total outside diameter of the rod, eventually become parallel to the axis—and then, under continuing influence of the gradation of refractive index, continue to be deflected toward the axis and finally cross the axis.

Because of the cylindrical symmetry of the index gradation, all rays diverging from a particular point on the axis reconverge on the axis at a common point regardless of the initial angles (about the axis) at which they are oriented. Moreover, the refractive-index variation is such that the reconvergence point is independent of initial angle of divergence from the axis. The path of each ray is nearly sinusoidal, crossing and recrossing the rod axis with progress down the rod, the distance between nodes depending only on the wavelength of the light. It is common to refer to a GRIN rod whose length is exactly equal to the distance between adjacent nodes, which is to say half of the "wavelength" of the sinusoid, as a "half-pitch rod."

Such a rod refocuses light diverging from a point on its axis at one end to the corresponding point on the axis at its other end. Moreover, such a half-pitch rod refocuses light from any point at one end to the corresponding point on the other end of the rod—with an inversion relative to the axis. In other words, a half-pitch GRIN rod is an imaging device, which inverts the image. Such rods have received wide use in imaging applications, and some limited use in pressure-hull penetrators as discussed immediately below, but to my knowledge no utilization relating to fiber-optic connectors as such, heretofore.

Fiber-optic systems have considerable appeal for signal transmission between the modules of undersea rescue or exploration vehicles, for use at extreme depths and extremely high pressures. To avoid failure of such vehicles under the pressures involved, they are sometimes constructed in the form of a plurality of spheres, with one or more carrying human divers and the remainder carrying equipment. Operational monitoring and control signals between these spherical modules can be carried by optical fibers, but the penetration of the spherical hulls by the fibers must be effected in such a way as to avoid forming a stress point in a hull, or of inducing even a small leak. Along these lines, physically penetrating a spherical hull with a small-diameter optical fiber can produce some awkward problems.

For example, U.S. Pat. No. 3,825,320, which issued July 23, 1974 to John T. Redfern, discloses two variations of an optical penetrator for undersea use. One of these makes use of a cylindrical half-pitch GRIN rod (31a in FIG. 2 of that patent), held by epoxy in a cylindrical bore, and the other uses a tapered optic-fiber bundle, within a tapered plug (element 29 in FIG. 1 of that patent).

The cylindrical-rod design relies on the epoxy to prevent the rod from being rammed into the interior of the vessel by the pressure differential. The tapered-core design seeks to minimize that risk by the self-sealing characteristic of a conical frustum pressured at its base; but by converting the axial force on the plug and fiber bundle to radial force on the hull this design applies a splitting force to the hull. The tapered plug has the potential for acting as a wedge to rupture the hull. The fundamental weakness in such a design relates from the use of small-diameter fittings actually physically penetrating the hull, rather than large-diameter, plate-shaped structures applied parallel to and thus reinforcing the hull. But a GRIN rod such as that in the referenced patent cannot (at least in the present state of the art) be made in the form of a large-diameter plate-shaped element.

My invention in its basic embodiment avoids the accurate-seating requirement of the fiber-optic connector art, and in another embodiment provides a deep-undersea-hull optical penetrator design which is naturally compatible with large-diameter reinforcing-plate geometries.

BRIEF SUMMARY OF THE INVENTION

My invention makes use of a GRIN rod to avoid the problems of abutment—and consequent requirement of accurate seating, and danger of scratching damage—in a fiber-optic connector. As a byproduct my invention provides a means for reliable optical-signal penetration of a spherical diving hull without physical penetration by an optical fiber.

The connector design is based on use of a quarter-pitch GRIN rod. A rod of this length functions as a collimator; its behavoir is the same as a lens separated from an image by a distance equal to its own focal length. Thus it may be said that the length of the rod is one focal length. Rays diverging from a point on the axis at one end of such a rod are collimated upon exit at the other end.

Each of the two fibers to be mated is cemented to one end of a one-focal-length GRIN rod, with a diameter much larger than the fiber. The light from the emitting fiber is spread and collimated, and leaves the rod as a collimated beam. The receiving rod performs the inverse transformation, focusing the light into the end face of the receiving fiber.

When the connector is made, each fiber is positioned very accurately so that the light is collimated parallel to the axis of the rod. Customarily the rod is a right circular cylinder, whose geometric axis is congruent with the optical axis, so the collimated light is parallel to the cylindrical outer wall of the rod, and perpendicular to the flat, polished end faces of the emitting and receiving rods through which the collimated beam respectively exits and enters. With each fiber positioned in this way with respect to its respective rod, each fiber-rod pair is cemented together permanently. In effect each optical fiber is now terminated by a permanently affixed and aligned collimator.

When the two end-faces of the respective rods are faced toward each other, light from the emitting fiber is collimated by the attached rod, passes between the two rods and is refocused by the second rod into the attached receiving fiber—provided only that the two rods are held in precise angular alignment. If one side is cocked with respect to the other, then the input fiber will not be focused on the output fiber. Such misalignment is prevented by providing suitable alignment means, such as (if the two GRIN rods are of the same outside diameter) plugging both sides into a tight-fitting cylindrical sleeve.

Since the beam passing between the rods is collimated parallel to the system axis, the two rods need not touch each other. Since the light is collimated, there is no significant change in the focus when they are separated, as long as angular alignment is maintained.

Moreover, the refractive index in the gap is immaterial since the rod faces are plane. Therefore a pressure window can pass through this gap; this is the basis for embodying the invention in a pressure-hull penetrator.

The principles and features introduced above, and their advantages, may be more-fully understood from the detailed disclosure hereunder, with reference to the accompanying drawings, of which:

DESCRIPTION OF PREFERRED EMBODIMENTS

Figure 1:
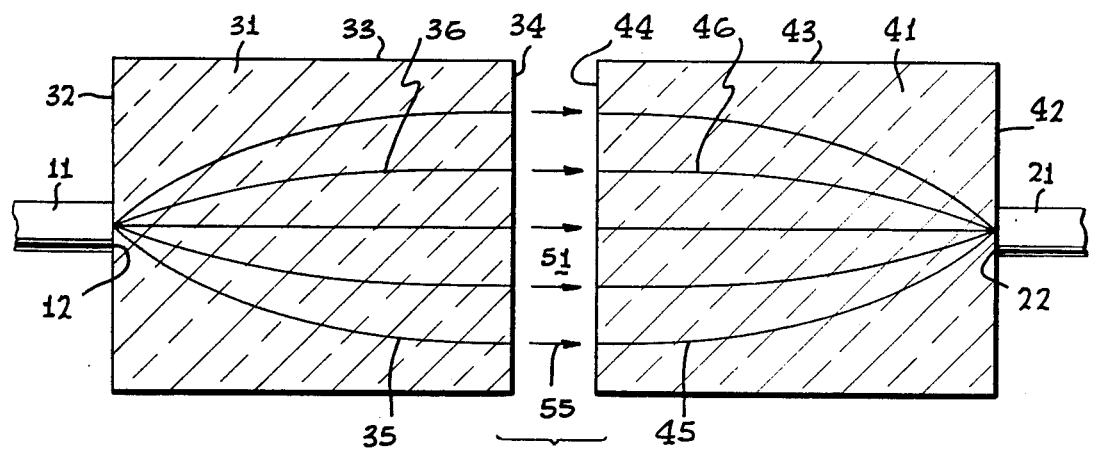
FIG. 1 is an optical schematic diagram of a connector made in accordance with my invention.

As illustrated in FIG. 1, the emitting optical fiber 11 is cemented with its end-face 12 abutting the end 32 of quarter-pitch graded-index rod 31, at the axis of rod 31, and with the axes of fiber 11 and rod 33 congruent. The diameter of the rod 31 is much larger than that of the fiber 11, so that not even rays at the outside of the output cone of light from fiber 11 can escape through the cylindrical wall 33 of rod 31 before being deflected parallel to the axis of rod 31. As a result of these constraints, all light rays (e.g., rays 35 and 36) which diverge from the end 12 of rod 11 must leave the remote face 34 of the rod 31 mutually parallel, and parallel to the axis of the rod 11 and parallel also to its outer cylindrical surface 33.

The rays proceed across intervening space 51, as at 55, maintaining the same parallelism, and enter polished flat end-face 44 of the receiving quarter-pitch graded-index rod 41. Face 44 is carefully oriented to be parallel to face 34, so the rays all enter face 44 perpendicular to that face, and parallel to the axis of rod 41 and to its outer cylindrical surface 43.

All of these parallel rays (e.g., rays 45 and 46) then converge to a focus at the remote face 42 of the rod 41, and on the axis of the rod 41. The end-face 22 of receiving optical fiber 21 is cemented in abutment with the end-face 42 of rod 41, at the axis of rod 41, and with the axes of fiber 11 and rod 41 congruent. These constraints result in all of the converging rays being coupled efficiently into the end-face 22 of receiving fiber 21.

To the extent that the rays 55 are accurately collimated parallel to the axis of the system, the width of intervening space 51 has no effect upon the refocusing of the beam into fiber end-face 22.

To the extent that the fiber 11 is *not at* the axis of the rod 31, the rays 51 will fail to be perpendicular to the faces 34 and 44, negating the advantages of paraxial collimation. To the extent that fiber 11 is *not parallel* to the axis of rod 31, the image of end 12 at face 42 will contain rays exceeding the maximum acceptance angle (for total internal reflection) of receiving fiber 21—resulting in energy loss at interface 22. If the nonparallelism between fiber 11 and rod 31 is severe, some rays may even escape through the cylindrical outer wall 33 of rod 31, causing an additional component of energy loss.

Of course, if fiber 11 *is* properly aligned with rod 31, then fiber 21 likewise must be (1) on-axis with respect to rod 41 (or part of the image of end 12 at face 42 will simply miss the end aperture 22 of fiber 21); and (2) the axis of fiber 21 must be parallel with the axis of rod 41 or part of the image energy will be lost by entering at an angle exceeding the maximum acceptance angle.

In practical terms, one does not expect such alignment constraints to be satisfied "perfectly." Operability of an invention in the field of optics (and therefore the claimable scope of such an invention) often depends on the sensitivity of system response to nonideal conditions such as misalignment.

In theory for the present invention, at least to a first-order approximation, misalignment of one sort can be compensated by misalignment of another sort. For example, if emitting fiber 11 is off-axis with respect to rod 31, the result is primarily an angular error of the still-collimated beam at 51; cocking rod 41 with respect to rod 31 would provide a first-order correction. Likewise if emitting fiber 11 is on, but at an angle to, the axis of rod 31, a first-order correction to the resulting acceptance-mismatch problem is obtained by placing fiber 21 at a like angle with respect to rod 41.

There are three limitations to this sort of approach: (1) aberrations would prevent total elimination of higher-order mismatches and hence energy loss; (2) the need to cock the two rods with respect to each other would preclude use of a simple continuous cylindrical sleeve for alignment of the rods; and (3) each connector would consist of a pair of custom-matched rod-and-fiber terminations, so only one fiber could be coupled into any other with assurance of good energy efficiency.

This last point would in turn have two adverse implications. First, even though in a given laboratory or equipment numerous cross-connections might be theoretically possible and useful, and the connector bodies might all look alike, the user could only lose track of the originally provided pairings at his peril. Second, it would be virtually impossible to make half-connectors commercially available as spare parts or otherwise.

Moreover, modern production techniques, using jigs and alignment fixtures, are amenable to uniform conaxial alignment of all half-connectors, so there is little technical reason to custom-align connectors. For all these reasons the conaxial configuration described above is strongly to be preferred.

Nevertheless, custom alignment is feasible, to the extent and with the qualifications already noted, and is within the scope of my invention and certain of the appended claims.

At an engineering level of analysis it must be noted that slight divergence of the beam at 51 necessarily results from the noninfinitesimal diameter of the emitting fiber 11: even when the fiber 11 and rod 31 are precisely conaxial, the periphery of the fiber is off-axis. The beam divergence is readily calculated, and places a constraint upon the maximum permissible separation of faces 34 and 44.

A single connector constructed in accordance with my invention can carry a great multiplicity of signals. Multiplexing can be effected on the basis of electronic modulation of the source, physical "chopping" of the light beam, optical wavelength, and/or fiber "mode" (angle).

In using optical-wavelength multiplexing, care must be taken to limit the total wavelength range used, inasmuch as chromatic effects displace images axially even for a continuous half-pitch GRIN rod. These effects are even more troublesome in the case of optically coupling two separated quarter-pitch rods. Nonetheless, where the separation of faces 34 and 44 is moderate, engineering calculations will reveal a substantial number of usable optical-wavelength intervals.

"Mode" refers to the angle at which a tightly collimated beam enters an optical fiber with respect to the fiber axis. Subject to various constraints and qualifications well-known in the fiber-optics art, the angle of such a beam is conserved in passing along an optic fiber. Even a separated pair of quarter-pitch GRIN rods preserves the mode—irrespective (within engineering limits) of separation distance.

Consequently connectors embodying my invention are compatible with mode-multiplexing systems.

Figure 2:
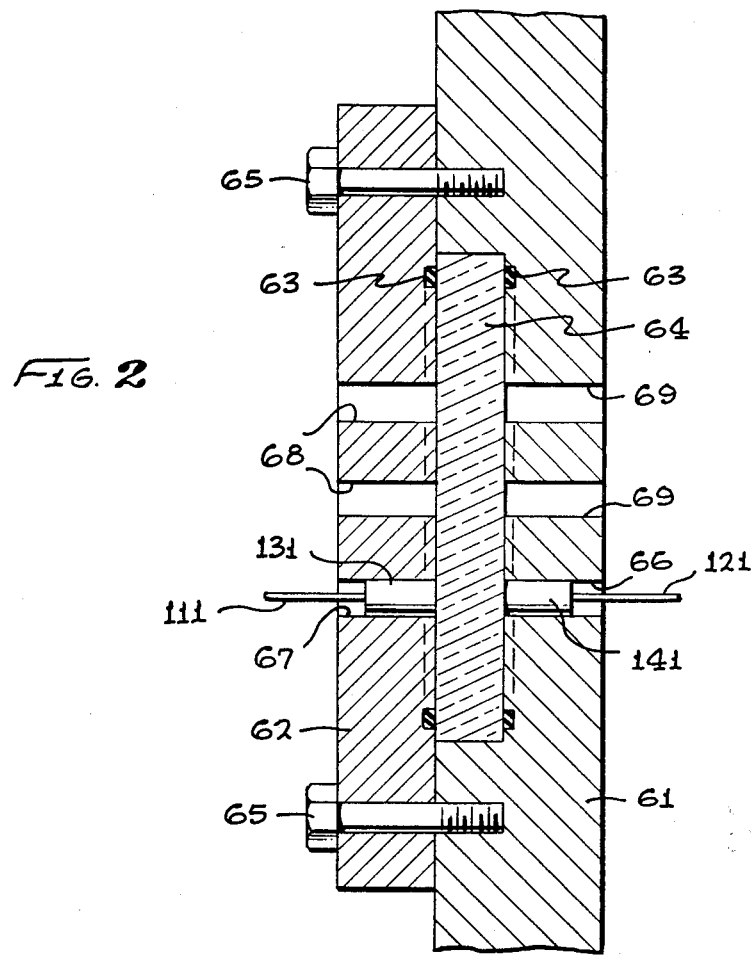
FIG. 2 is a cross-sectional elevation of a pressure-hull feedthrough or penetrator embodying the principle of my invention.

FIG. 2 illustrates the adaptation of the principle of my invention to a pressure-hull penetrator. Here the GRIN rods 131 and 141, with their attached optical fibers 111 and 121 respectively, are separated by a window 64 forming a part of pressure hull 61. Plate 62 is secured to the high-pressure side of hull 61 by multiple bolts, typified by bolts 65. The seal is made watertight by O-rings 63. Cylindrical channels 66 and 67 are accurately conaxial, so as to hold the GRIN rods 141 and 131, respectively (and additional like pairs of rods for which the channels 68 and 69 shown unused in FIG. 2 are reserved), in accurate angular alignment even when enormous pressures of deep-undersea operation are applied to the hull. To obtain such stability it is necessary to use quite thick hull 61 and plate 62 members, and many bolts 65.

Principle advantages of my invention with respect to its use as a penetrator for submersibles arise from the area-amplification effect of the GRIN rods. Underwater apparatus is subjected to enormous forces, leading to distortion. Such bending, squeezing and warping in the region of a fiber-optic connector interface can misalign the two elements of a connector. Calculations indicate that a 10-micron mismatch between two directly abutted optical fibers result in a very large fractional power loss; whereas with the GRIN-rod connector of my invention a mismatch of 250 microns decreases power transmission by less than 3 dB. This insensitivity to displacement is not attained in the Redfern prior-art undersea system, wherein the fiber at each end of the GRIN rod is merely abutted, not secured, to the rod. There is no area-amplification effect at the ends of a half-pitch rod.

Window 64 (and the mating metal components) may have plane parallel surfaces, or spherical surfaces of identical radius, without in principle disturbing the collimated beam through the window. A small and designably negligible defocusing arises from use of a window with two concentric spherical surfaces. Consequently it is possible to use an optical penetrator pursuant to my invention in conjunction with a submersible formed as a transparent glass or plastic sphere. In such a case the alignment sleeves or receptacles would be glued or otherwise fastened to the inner and outer sphere surfaces in proper alignment.

It will be noted that the end-faces 32 and 42 of GRIN rods 31 and 41, respectively, in FIG. 1 are not used for optical transmission except at the limited areas near the axes of the rods. Hence the outer areas, away from the axis, need not be optically finished. In fact, in principle it is not necessary to optically finish the near-axial areas either, if a cement is used between the fiber and corresponding GRIN rod which has the same index of refraction as does the rod near its axis. In practice, however, a good optical finish is usually put on faces 32 and 42, as well as the intermediate faces 34 and 44.

The foregoing disclosure is intended to be exemplary only, not to limit the scope of my invention—which scope is to be ascertained by reference to the following claims.

I claim:

1. A bulkhead optical-circuit feedthrough for operatively coupling two optical fibers on opposite sides of a bulkhead of a pressure hull, and for use with light having a specified nominal wavelength, the feedthrough comprising:

two cylindrical graded-index rods, each of which has at least one polished flat end and an axis perpendicular thereto, and each of which rods is equal in length to one focal length at such nominal wavelength;

each of such two optical fibers being permanently cemented to a respective one of said rods, at the opposite end from said polished end thereof, and with the axis of each such fiber substantially at the axis of the corresponding rod;

a window forming a portion of such bulkhead and defining two opposite optical surfaces;

two strong, rigid plates forcibly securing the window to adjoining portions of such bulkhead, both the window and the plates being large-diameter, plate-shaped structures applied parallel to such bulkhead in a reinforcing configuration; and the plates defining a pair of accurately paraxial cylindrical channels, each snugly enclosing a respective one of the rods and thereby aligning the first and second rods so that said polished ends face each other with their respective polished ends accurately parallel, the said window being interposed between the two facing ends of the two rods so that each of said two window surfaces is adjacent a respective one of said polished rod ends.

* * * * *